United States Patent
Xu (10) Patent No.: US 11,693,841 B2
(45) Date of Patent: Jul. 4, 2023

(54) HASH FOR STRUCTURAL DATA WITH SAME DATA MEANING

(71) Applicant: International Business Machines Corporation, Armonk, NY (US)

(72) Inventor: Chun Lei Xu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/733,507

(22) Filed: Jan. 3, 2020

(65) Prior Publication Data
US 2021/0209084 A1 Jul. 8, 2021

(51) Int. Cl.
G06F 16/22 (2019.01)
G06F 16/23 (2019.01)
G06F 16/84 (2019.01)

(52) U.S. Cl.
CPC ...... *G06F 16/2255* (2019.01); *G06F 16/2365* (2019.01); *G06F 16/88* (2019.01)

(58) Field of Classification Search
None
See application file for complete search history.

(56) References Cited

U.S. PATENT DOCUMENTS

| | | | |
|---|---|---|---|
| 7,437,555 B2 | 10/2008 | Douceur | |
| 7,613,701 B2 | 11/2009 | Zhao | |
| 9,542,406 B1* | 1/2017 | Bourbonnais | ....... G06F 16/2365 |
| 10,075,298 B2 | 9/2018 | Struttmann | |
| 2002/0184340 A1* | 12/2002 | Srivastava | .......... H04L 67/2842 709/219 |
| 2003/0177442 A1* | 9/2003 | Lou | ........ G06F 40/194 715/234 |
| 2004/0098667 A1* | 5/2004 | Atkinson | ............. G06F 40/123 715/239 |
| 2004/0244012 A1* | 12/2004 | Massarenti | .......... G06F 9/4493 719/319 |
| 2005/0204141 A1* | 9/2005 | Sayers | ............... G06F 16/2228 713/181 |
| 2008/0235260 A1* | 9/2008 | Han | ..................... G06F 40/151 707/999.102 |

(Continued)

OTHER PUBLICATIONS

StackOverflow-bart ("Generating a good hash code (GetHashCode) for a BitArrays"), 2010, accessible from <https://stackoverflow.com/questions/3125676/generating-a-good-hash-code-gethashcode-for-a-bitarray> (Year: 2010).*

(Continued)

*Primary Examiner* — Polina G Peach
*Assistant Examiner* — Anugeetha Kunjithapatham
(74) *Attorney, Agent, or Firm* — Stephen R. Yoder (57) ABSTRACT

Provides a method for hashing structural data. According to this method, structural data that includes a plurality of keys and a plurality of values corresponding to respective keys is received. A plurality of key-value pairs can be parsed from the structural data, with each of the plurality of key-value pairs including a key and a value respectively corresponding to the key. A hash value of the plurality of key-value pairs is computed according to a predefined policy as a hash value of the structural data, wherein the predefined policy includes sorting the plurality of key-value pairs or processed key-value pairs.

20 Claims, 7 Drawing Sheets

(56) References Cited

U.S. PATENT DOCUMENTS

| | | | |
|---|---|---|---|
| 2010/0257149 A1* | 10/2010 | Cognigni | G06F 16/27 |
| | | | 707/698 |
| 2010/0268952 A1* | 10/2010 | Chung | H04L 9/3247 |
| | | | 713/170 |
| 2014/0013452 A1* | 1/2014 | Aissi | G06F 21/85 |
| | | | 726/30 |
| 2018/0077129 A1 | 3/2018 | Baum | |
| 2019/0121886 A1* | 4/2019 | Shukla | G06F 16/2365 |
| 2019/0205255 A1* | 7/2019 | Hansen | G06F 16/2246 |
| 2019/0272337 A1* | 9/2019 | Stewart | G06F 16/2282 |

OTHER PUBLICATIONS

StackOverflow-rnavagamuwa, "Generate SHA-256 hash for a XML in Java", 2017, accessible from <https://stackoverflow.com/questions/43571694/generate-sha-256-hash-for-a-xml-in-java?rq=1> (Year: 2017).*

NPL-Fisteus: Fisteus et al., "Hashing and canonicalizing Notation 3 graphs", Journal of Computer and System Sciences 76 (2010) 663-685, 2010 (Year: 2010).*

Mell et al., "The NIST Definition of Cloud Computing", NIST National Institute of Standards and Technology U.S. Department of Commerce, Special Publication 800-145, Sep. 2011, 7 pages.

Tatikonda et al., "Hashing Tree-Structured Data: Methods and Applications", Department of Computer Science and Engineering, The Ohio State University, Columbus, OH, printed on Sep. 25, 2019, 14 pages, <ftp://ftp.cse.ohio-state.edu/pub/tech-report/2009/TR34.pdf>.

* cited by examiner

HASH FOR STRUCTURAL DATA WITH SAME DATA MEANING

BACKGROUND

Embodiments of the present invention relate to the field of data processing.

A hash function is a computational method that can map an indeterminate size of data or a group of character into a fixed size of data, referred as a hash value. Hash functions have typically used for data consistency/integrity validation in industries such as cloud computing, BlockChain, e-commerce, information transmission and the like.

SUMMARY

According to an aspect of the invention, a method for hashing structural data is disclosed. According to the method, structural data is received, the structural data comprising a plurality of keys and a plurality of values corresponding to respective keys. A plurality of key-value pairs can be parsed from the structural data, each of the plurality of key-value pairs comprising a key and a value corresponding to the key. A hash value of the plurality of key-value pairs is computed according to a predefined policy as a hash value of the structural data, wherein the predefined policy comprises sorting the plurality of key-value pairs or processed key-value pairs.

According to another aspect of the invention, a computer-implemented system is disclosed. The system may include a computer processor coupled to a computer-readable memory unit, said memory unit comprising instructions that when executed by the computer processor implements the above method.

According to yet another aspect of the invention, a computer program product is disclosed. The computer program product comprises a computer readable storage medium having program instructions embodied therewith. When executed on one or more processors, the instructions may cause the one or more processors to perform the above method.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
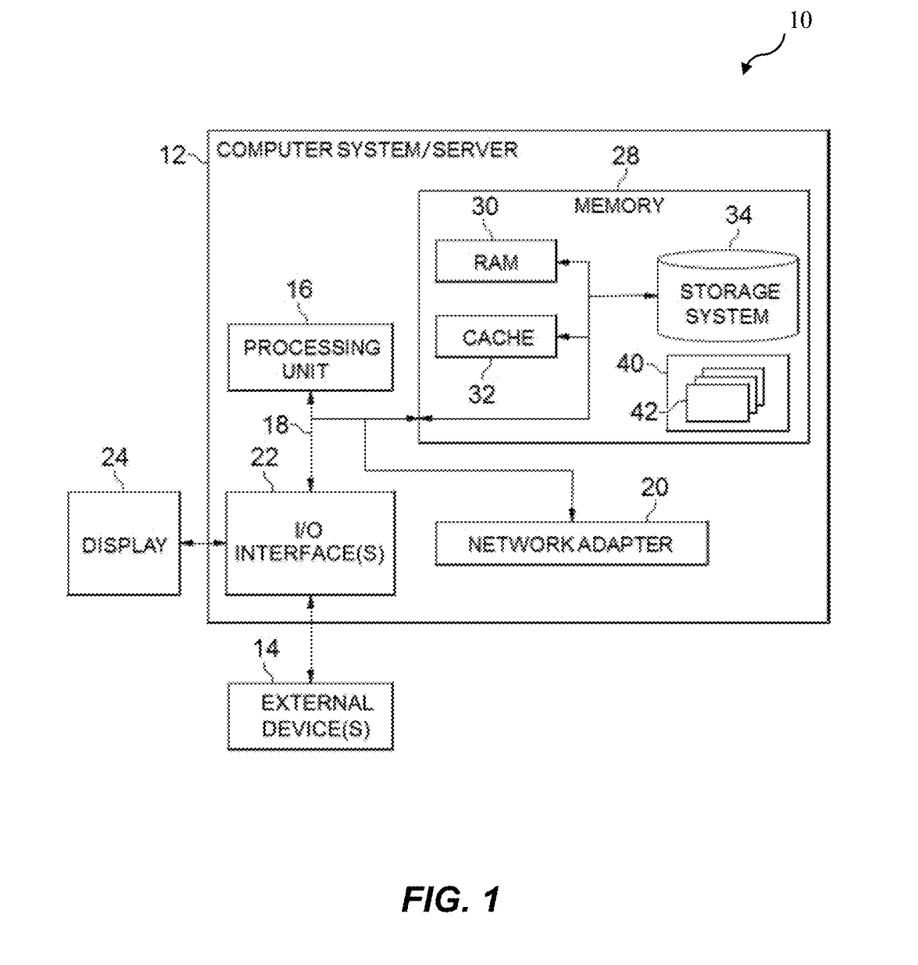
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
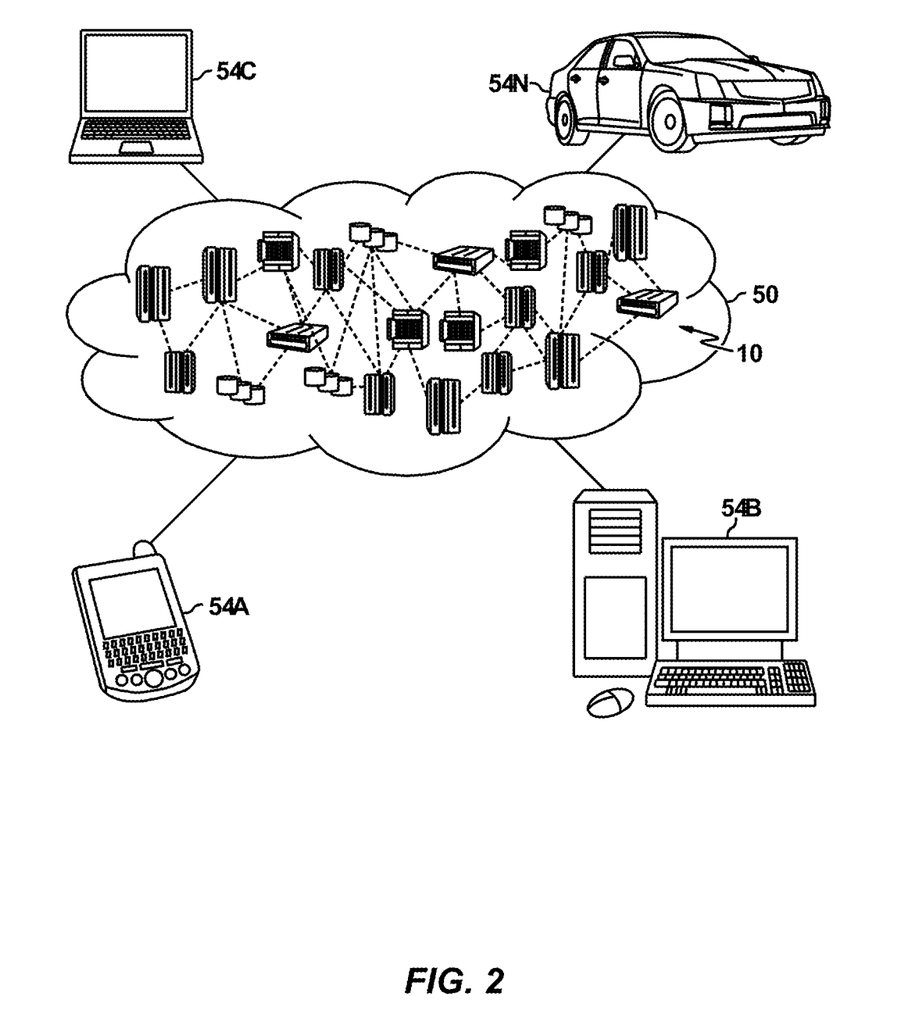
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
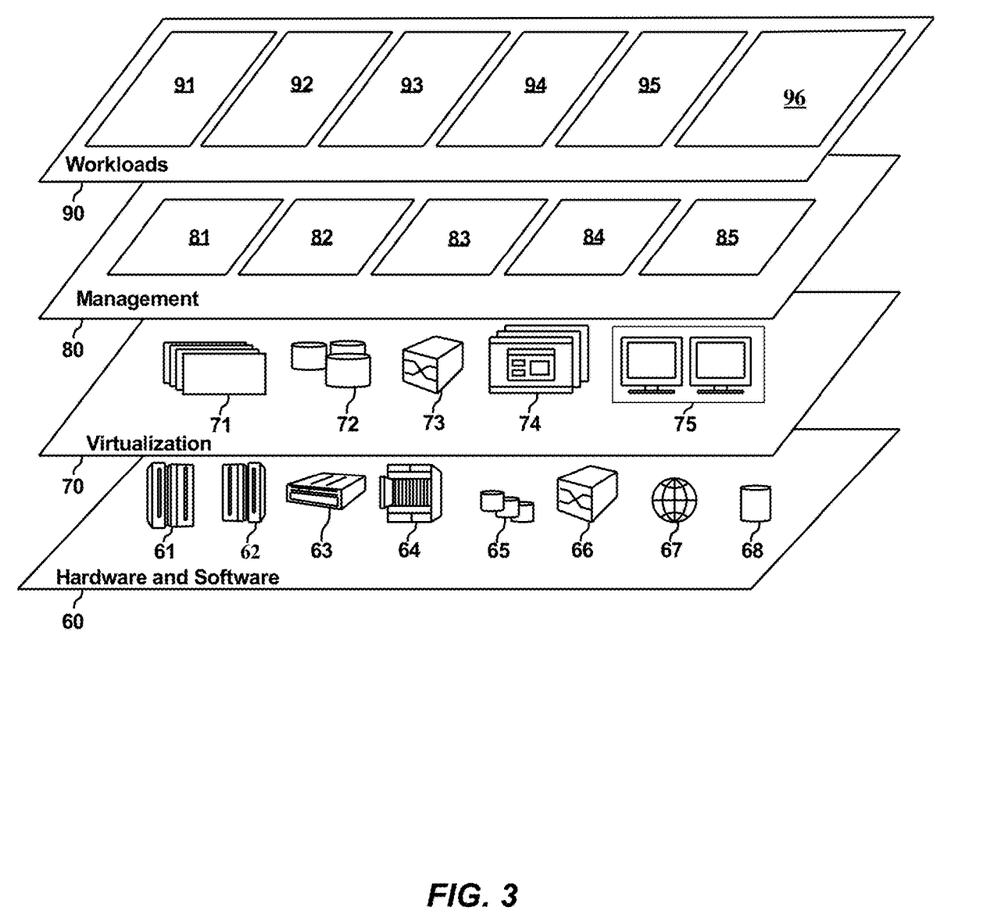
FIG. 3 depicts abstraction model layers according to an embodiment of the present invention.

Referring now to FIG. 3, a set of functional abstraction layers provided by cloud computing environment 50 (as shown in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hash processing 96.

A hash function has been widely used for data consistency/integrity validation in industries such as cloud computing, BlockChain, e-commerce, information transmission related and the like. There are many kinds of hash functions, such as MD4, MD5, SHA-1, SHA-256, etc. In the following description, MD5 is taken as an exemplary implementation of the hash function. And those skilled in the art can understand that other hash functions can be applied to the present disclosure.

Figure 4:
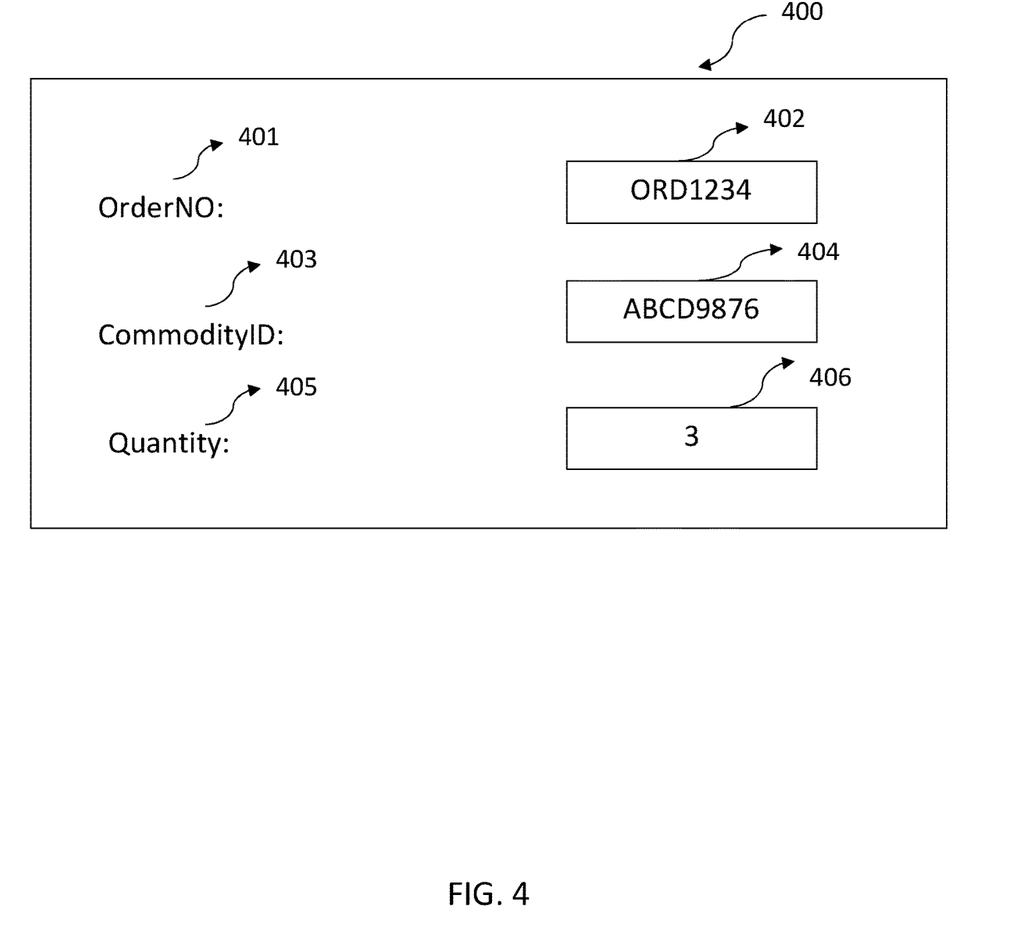
FIG. 4 shows exemplary structural data indicating an order created by a customer according to an embodiment of the present invention.

A usage scenario is considered in which the hash function is used on an E-commerce website. In the scenario, FIG. 4 shows exemplary structural data indicating an order 400 created by a customer according to an embodiment of the present invention. The order 400 includes three elements. The first element, e.g. the string "OrderNO" referred as 401, represents an order number of the order 400. The second element, e.g. the string "CommodityID" referred as 403, represents identification of a commodity purchased in the order 400. And the third element, e.g. the string "Quantity" referred as 405, represents a quantity of the commodity purchased in the order 400. Respective values of the three elements are string "ORD1234" referred as 402, string "ABCD9876" referred as 404 and numeric character 3 referred as 406. The order 400 may be transmitted across several entities, such as a manufacturer, a logistics supplier, a third-party online payment entity, etc. Each entity may need to validate the order 400 received to ensure consistency or integrity of the order 400. A hash value of the order 400 can achieve the above validation goal. Thus, there is a need to compute the hash value of the order 400 for each entity.

Applications in these entities may be developed in different programming languages and/or in different platforms. The order 400 used by the applications can be represented as various structural data. For example, the order 400 can be packaged into an object in Java program language, in which object notation data (which represents all variables and their corresponding values in the Java object, and an element in the object notation data represents a variable and its corresponding value) can be represented as: Order order=new Order("ORD1234", "ABCD9876", 3)(the three variables, e.g. variables "OrderNO", "CommodityID" and "Quantity", have been defined in a class named Order). In another example, the order 400 can be defined as a JavaScript object in JavaScript program language, e.g. order={OrderNO: "ORD1234", CommondityID: "ABCD9876", Quantity: 3}; In still another example, the order 400 can be expressed as structural data based on XML like:
<Order>
  <OrderNO>ORD1234</OrderNO>
  <CommodityID>ABCD9876</ CommodityID>
  <Quantity>3</Quantity>

</Order>

Then hash values of above various structural data can be computed by the various applications in various entities. For example, the order 400 represented as java object notation data can be serialized into a bit array, and a hash value of the java object notation data can be computed based on the bit array. Here the hash value of the order 400 represented as the Java object notation data using MD5 is 6139c405f7a607f0e05ba8c983a5b2c7. In another example, the order 400 represented as JavaScript object can be converted into a string in JSON format like "{"OrderNO": "ORD1234", "CommondityID": "ABCD9876", "Quantity": 3}", and a hash value of the JavaScript object can be computed based on the string. Here the hash value of the order 400 represented as the JavaScript object using MD5 is f22e375511f56ab458b98f6081121a02. In yet another example, the order 400 represented as XML format can be converted into XML plain text, and a hash value of the order 400 in XML format can be computed based on the XML plain text. Here the hash value of the order 400 in XML format using MD5 is fabc1cb48dbdf9f1e1f27ebec6f2cc37. It can be found that although the three kinds of structural data represent substantially the same order 400, their respective hash values computed are different.

On the other hand, the sequence of the elements in the above order 400 can be changed, such as the order 400 can also be expressed as a second JavaScript object order={CommodityID: "ABCD9876", OrderNO: "ORD1234", Quantity: 3}, and its corresponding JSON text is "{"CommodityID": "ABCD9876", "OrderNO": "ORD1234", "Quantity": 3}". The two JavaScript objects have the same meaning, but the hash value of the second JavaScript object based on the string is e879298ab8822b939ee924f8d43b58c3, which is different from the hash value f22e375511f56ab458b98f6081121a02 of the JavaScript object order={OrderNO: "ORD1234", CommondityID: "ABCD9876", Quantity: 3}. It is appreciated that JavaScript objects representing the same order 400 with different elements sequences have same hash values.

Even the order 400 is expressed as the same data structure, the same structure data may be processed by different platforms and/or by different programming languages. As known, the hash value of Java object notion data is computed per bytes, essentially per bit of data. In order to compute a hash value of structural data represented as the Java object notion data, each two elements (bytes) of the object need to be joined with a delimiter so that all elements of the object can be joined in a certain sequence of the elements into a sequence of bits (e.g. string or bit array). This processing is referred as serialization or encoding. For example, the order 400 may be serialized as {"OrderNO": "ORD1234", "CommodityID": "ABCD9876", "Quantity": 3} in one platform, where the delimiter "," is used; while the order 400 may be serialized as {"OrderNO": "ORD1234"; "CommodityID": "ABCD9876"; "Quantity": 3} in another platform, where the delimiter ";" is used. The different serializations or encodings for two substantially the same orders may lead to different sequences of bit arrays of the two orders, which may result in different hash values.

It is hoped that the hash values for the above order 400 represented in different data formats in different platforms and/or in different programming languages with different element sequences are the same in order to verify the consistency or integrity of the order 400. The invention proposes methods, systems, and computer program products for hashing structural data to make sure that hash values of different structural data with the same data meaning represented in different data formats in different platforms and/or in different programming languages with different element sequences are the same.

Figure 5:
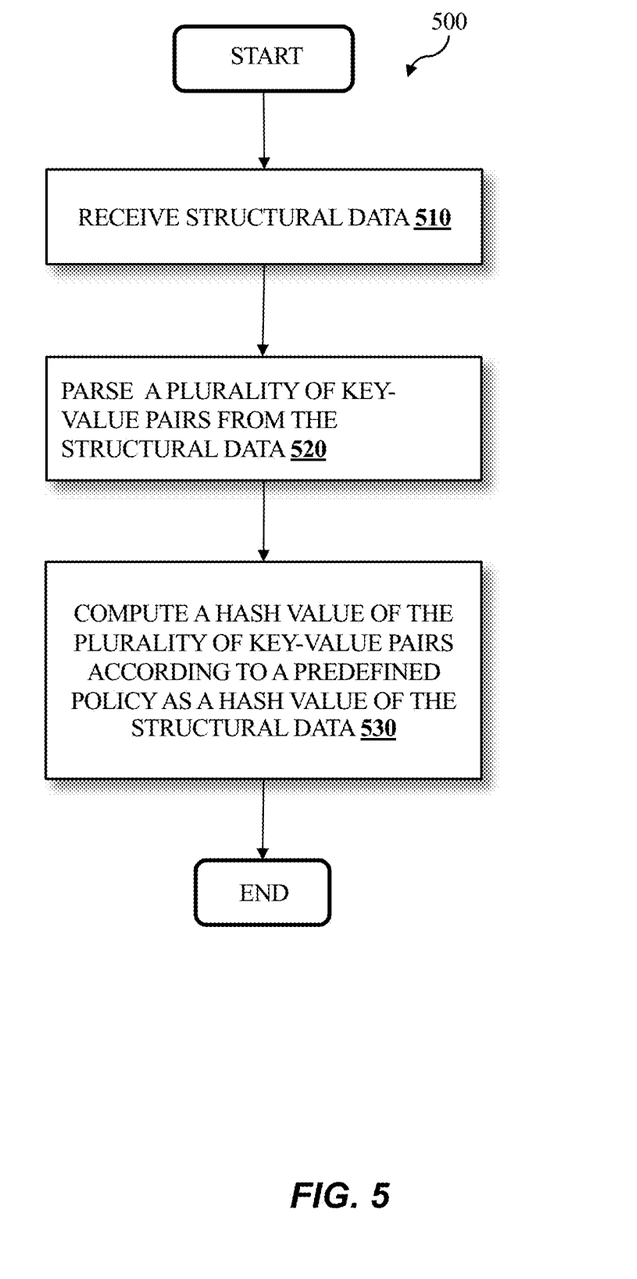
FIG. 5 depicts a schematic flowchart of a method for hashing structural data according to an embodiment of the present invention.

FIG. 5 depicts a schematic flowchart of a method 500 for hashing structural data according to an embodiment of the present invention. In some embodiments, the method 500 can be implemented in any programming languages in any platforms which can be invoked by a main program or by another function.

Referring to FIG. 5, at step 510, structural data to be hashed is received, the structural data comprising a plurality of keys and a plurality of values corresponding to the respective keys. According to embodiments of the invention, the received structural data can be the order 400 represented as the above object notion data, the above JavaScript object in JSON format, or the above structural data based on XML, and the like.

At step 520, a plurality of key-value pairs can be parsed from the structural data, each of the plurality of key-value pairs comprising a key and a value corresponding to the key. For example, considering the above order 400 expressed as the JavaScript object in JSON format {"OrderNO": "ORD1234", "CommondityID": "ABCD9876", "Quantity": 3}, there are three elements, each element comprising a variable and a value of the variable. These three variables, e.g. "OrderNO", "CommodityID", "Quantity", which are also referred as keys denoting properties of the object. Further three values, e.g. "ORD1234", "ABCD9876" and "3", represent the values for respective properties (keys). In this way, an element of the structural data can be parsed as a key-value pair, and the structural data can be parsed as a plurality of key-value pairs. As an example, Table 1 shows three key-value pairs parsed from the above order 400 represented as JavaScript object in JASON format.

TABLE 1

| Key | Value |
| --- | --- |
| OrderNO | ORD1234 |
| CommondityID | ABCD9876 |
| Quantity | 3 |

At step 530, a hash value of the plurality of key-value pairs is computed according to a predefined policy as a hash value of the structural data, where the predefined policy comprises sorting the plurality of key-value pairs or processed key-value pairs. The predefined policy provides some parameters about how to compute a hash value of the plurality of key-value pairs. According to some embodiments of the present invention, in a predefined policy, hash value groups of bit arrays of all key-value pairs in the plurality of key-value pairs are computed first and then the overall computed hash value groups are sorted in order to get the hash value of the structural data. While in another predefined policy, bit array groups of respective key-value pairs in the plurality of key-value pairs are sorted first and then hash value groups of respective bit array groups of overall key-value pairs in the plurality of key-value pairs are computed in order to get the hash value of the structural data. The detailed implementations will be described below.

Figure 6:
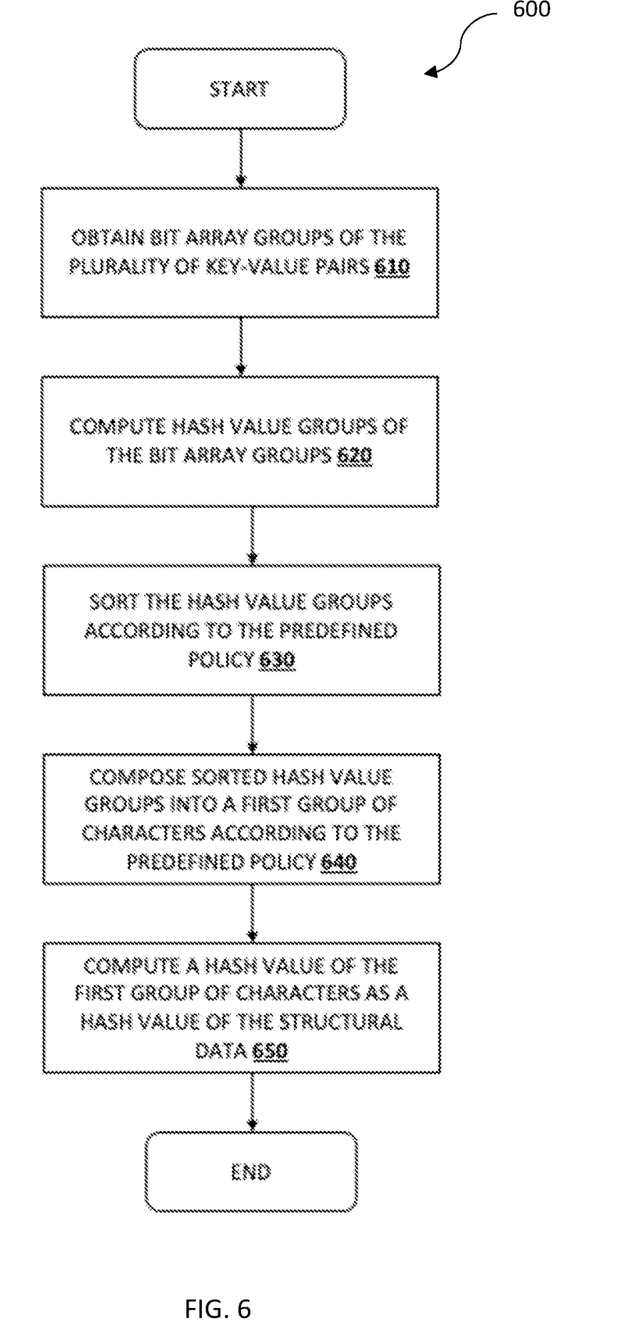
FIG. 6 depicts a schematic flowchart of a method according to an embodiment of the present invention.

In some embodiments, according to a predefined policy, hash value groups of a bit array of overall key-value pairs are sorted according to hash values of keys or hash values of values of respective key-value pairs or a composition of both. Specifically, FIG. 6 depicts a schematic flowchart of a method 600 to implement the step 530 in FIG. 5 according to an embodiment of the present invention. Referring to FIG. 6, at step 610, bit array groups of the plurality of key-value pairs are obtained, each of the plurality of bit array groups comprising a bit array of a key in a key-value pair of the plurality of key-value pairs and a bit array of a value corresponding to the key in the key-value pair. Here the key and the value corresponding to the key are believed as a character string. A bit array of each character string can be obtained using a specific encoding method in a computer, such as Unicode (which is an international encoding standard for use with different languages and scripts, by which each letter, digit, or symbol is assigned a unique numeric value that applies across different platforms and programs). A bit array of a key or a value can be a binary bit array, an octal bit array, a hexadecimal bit array, or any other kinds of bit array used by computers. Table 2 shows binary bit array groups of the plurality of key-value pairs shown in Table 1. For example, a binary bit array of character string "OrderNO" is "01001111 01110010 01100100 01100101 01110010 01001110 01001111", and a binary bit array of character string "ORD1234" is "01001111 01010010 01000100 00110001 00110010 00110011 00110100". It should be noted that there is no space between two bits in any bit array in Table 2.

At step 620, hash value groups of the bit array groups are computed, each of the hash value groups comprising a hash value of a bit array of a key in a bit array group and a hash value of a bit array of a value corresponding to the key in the bit array group. Table 3 shows computed hash value groups of the bit array groups shown in Table 2 using MD5 implementation. In some programming languages, the steps 610 and 620 can be combined into a function of computing a hash value of a string or a group of characters.

TABLE 2

| bit array(Key) | | | bit array (Value) | | |
|---|---|---|---|---|---|
| 01001111 | 01110010 | 01100100 | 01001111 | 01010010 | 01000100 |
| 01100101 | 01110010 | 01001110 | 00110001 | 00110010 | 00110011 |
| 01001111 | | | 00110100 | | |
| 01000011 | 01101111 | 01101101 | 01000001 | 01000010 | 01000011 |
| 01101101 | 01101111 | 01101110 | 01000100 | 00111001 | 00111000 |
| 01100100 | 01101001 | 01110100 | 00110111 00110110 | | |
| 01111001 01001001 01000100 | | | | | |
| 01010001 | 01110101 | 01100001 | 00110011 | | |
| 01101110 | 01110100 | 01101001 | | | |
| 01110100 01111001 | | | | | |

TABLE 3

| Hash(Key) | Hash( Value) |
|---|---|
| fe2ef0784fb1fb31a2b4a534da4793d3 | c68b6fe49558e324bdabc670d1f993dd |
| e75e438d30053208b36575623ff53be5 | c3d5cb99bb77c24003bbb10fe0b43af5 |
| 694e8d1f2ee056f98ee488bdc4982d73 | eccbc87e4b5ce2fe28308fd9f2a7baf3 |

At step 630, the computed hash value groups are sorted according to the predefined policy. The predefined policy may define how to sort these computed hash value groups. Note it should be avoided to compose the bit array groups into a group of character to get a hash value of the group of character directly, because a bit array group of "OrderNO"+"ORD1234" and a bit array group "OrderNOORD"+"1234" are exactly the same. In one embodiment, the sorting can be done according to numeric value of hash values of a bit array of a key in each of the hash value groups. The overall hash value groups can be sorted from a hash value group with a maximum hash value of a bit array of a key to a hash value group with a minimum hash value of a bit array of a key, or vice versa, the overall hash value groups can be sorted from a hash value group with a minimum hash value of a bit array of a key to a hash value group with a maximum hash value of a bit array of a key.

TABLE 4

| Hash(Key) | Hash( Value) |
|---|---|
| 694e8d1f2ee056f98ee488bdc4982d73 | eccbc87e4b5ce2fe28308fd9f2a7baf3 |
| e75e438d30053208b36575623ff53be5 | c3d5cb99bb77c24003bbb10fe0b43af5 |
| fe2ef0784fb1fb31a2b4a534da4793d3 | c68b6fe49558e324bdabc670d1f993dd |

In another embodiment, the hash value groups can be sorted based on hash value of a bit array of a value corresponding to a key in each of the hash value groups in the predefined policy. For example, the overall hash value groups can be sorted from a hash value group with a maximum hash value of a bit array of a value corresponding to a key to a hash value group with a minimum hash value of a bit array of a value corresponding to a key, or vice versa, the overall hash value groups can be sorted from a hash value group with a minimum hash value of a bit array of a value corresponding to a key to a hash value group with a maximum hash value of a bit array of a value corresponding to a key.

In yet another embodiment, the hash value groups can be sorted based on compositions of both a hash value of a bit array of a key and hash values of a bit array of a value corresponding to the key in the predefined policy. For example, the sum of a hash value of a bit array of a key and a hash value of a bit array of a value corresponding to the key in each of the hash value group can be used as the composition. Then the overall hash value groups can be sorted from a hash value group with a maximum value of a composition to a hash value group with a minimum value of a composition, or vice versa, the overall hash value groups can be sorted from a hash value group with a minimum value of a composition to a hash value group with a maximum value of a composition. Those skilled in the art may understand that the value of the composition can be computed based on other mathematical operation or logical operation of both a hash value of a bit array of a key and a hash value of a bit array of a value, such as a product operation, an XOR operation, a bit combination operation, etc. This is especially useful for some special scenarios in which two keys are the same or the two values are the same for the same keys or the same values may make the sorting different in different programming languages and/or in different platforms.

At step 640, the sorted hash value groups can be composed into a first group of characters according to the predefined policy. The predefined policy can also define how to compose any two hash values into the first group of characters. In some embodiments, there is no delimiter between two hash values in the first group of characters according to the predefined policy. In some embodiments, there is a predefined delimiter between two hash values in the first group of characters, such as ";", ",", "-", blank space, and the like according to the predefined policy. For example, first sorted hash value group (the first line), second sorted hash value group (the second line) and third sorted hash value group (the third line) shown in Table 4 are combined in sequence into a first group of characters shown in Table 5 in which no delimiter is used between two hash values. Those skilled in the art may understand that sorted hash value groups can also be composed into the first group of characters in another manner, such as all hash values of keys are placed at the beginning of the group of characters, while all hash values of values are placed at the end of the group of characters, or in other manners. Note there is no space between any two characters in the group of characters shown in Table 5.

TABLE 5

694e8d1f2ee056f98ee488bdc4982473eccbc87e4b5ce2fe28308fd92a7baf3
E75e438d30053208b36575623ff53be5c3d5cb99bb77c24003bbb10fe0b43af5
Fe2ef0784fb1fb31a2b4a534da4793d3c68b6fe49558e324bdabc670d1f993dd At step 650, a hash value of the first group of characters is computed as the hash value of the structural data according to the predefined policy. For example, a hash value of the first group of characters in Table 5 using MD5 is 4791081362c0e9e79d215cac4db803ab, thus the hash value of the order 400 can be believed as 4791081362 c0e9e79d215cac4db803ab. In fact, a bit array of the above first group of characters in Table 5 is first obtained in the implementation, then the hash value of the bit array is computed.

In this way, although two orders 400, which are substantially the same but expressed in different data structures and/or with different element sequences and/or in different programming languages and/or in different platforms, hash values of the two orders 400 can be obtained consistently.

Figure 7:
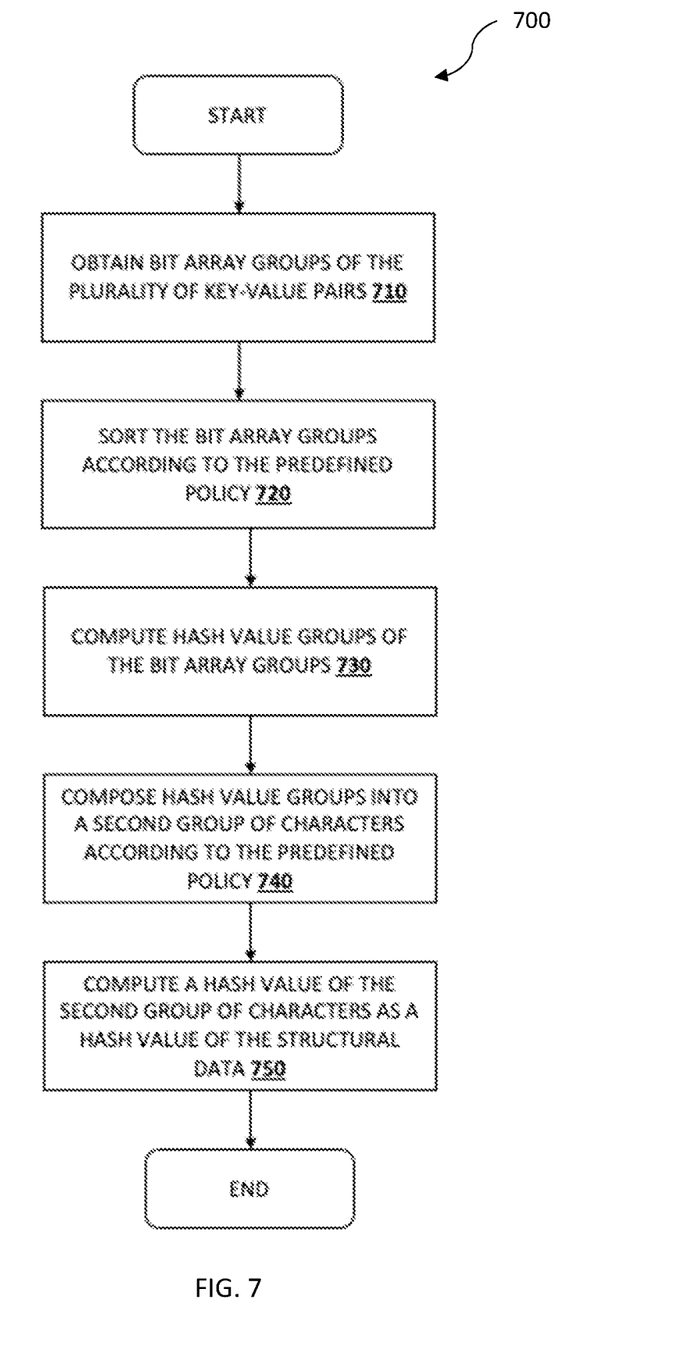
FIG. 7 depicts a schematic flowchart of another method to implement the step 530 in FIG. 5 according to an embodiment of the present invention.

In some embodiments, according to another predefined policy, bit array groups of the plurality of key-value pairs can be sorted according to either a bit array of a key or a bit array of a value corresponding to the key in each key-value pair, or a composition of both bit arrays. Specifically, FIG. 7 depicts a schematic flowchart of another method 700 to implement the step 530 in FIG. 5 according to an embodiment of the present invention. Referring to FIG. 7, at step 710, bit array groups of the plurality of key-value pairs are obtained, each of the bit array groups comprising a bit array of a key in a key-value pair of the plurality of key-value pairs and a bit array of a value corresponding to the key in the key-value pair. As indicated before, bit array groups of the plurality of key-value pairs shown in Table 1 have been shown in Table 2.

At step 720, the bit array groups of the plurality of key-value pairs are sorted according to the predefined policy. The predefined policy may define how to sort these the bit array groups. In one embodiment, the sorting can be based on a bit array of a key in each bit array groups in the predefined policy. For example, the overall bit array groups can be sorted from a bit array group with a maximum value of a bit array of a key to a bit array group with a minimum value of a bit array of a key, or vice versa, the overall bit array groups can be sorted from a bit array group with a minimum value of a bit array of a key to a bit array group with a maximum value of a bit array of a key. For example, Table 6 shows sorted bit array groups of the plurality of key-value pairs shown in Table 2, in which the overall bit array groups are sorted from a bit array group with a minimum value of a bit array of a key to a bit array group with a maximum value of a bit array of a key. It should be noted that there is no space between two bits in each bit array in Table 6.

TABLE 6

| Sorted bit array(Key) | Sorted bit array (Value) |
|---|---|
| 01000011 01101111 01101101 01101101 | 01000001 01000010 01000011 |
| 01101111 01101110 01100100 01101001 | 01000100 00111001 00111000 |
| 01110100 01111001 01001001 01000100 | 00110111 00110110 |
| 01001111 01110010 01100100 01100101 | 01001111 01010010 01000100 |
| 01110010 01001110 01001111 | 00110001 00110010 00110011 00110100 |
| 01010001 01110101 01100001 01101110 | 00110011 |
| 01110100 01101001 01110100 01111001 | |

In another embodiment, the bit array groups are sorted based on a bit array of a value corresponding to a key in each bit array groups in the predefined policy. For example, the overall bit array groups can be sorted from a bit array group with a maximum value of a bit array of a value corresponding to a key to a bit array group with a minimum value of a bit array of a value corresponding to a key, or vice versa, the overall bit array groups can be sorted from a bit array group with a minimum value of a bit array of a value corresponding to a key to a bit array group with a maximum value of a bit array of a value corresponding to a key.

In yet another embodiment, the bit array groups are sorted based on a composition of a bit array of a key and a bit array of a value corresponding to the key in each bit array group in the predefined policy. For example, the sum of a bit array of a key and a bit array of a value corresponding to the key can be used as the composition. Then the overall bit array groups can be sorted from a bit array group with a maximum value of composition to a bit array group with a minimum value of a composition, or vice versa, the overall bit array groups can be sorted from a bit array group with a minimum value of a composition to a bit array group with a maximum value of a composition. Those skilled in the art may understand that the composition can be based on other mathematical operation or logical operation of a bit array of a key and a bit array of a value corresponding to the key, such as a product operation, an XOR operation, a bit combination operation, etc. This is especially useful for some special scenarios in which two keys are the same or the two values are the same for the same keys or the same values may make the sorting different in different programming languages and/or in different platforms.

At step 730, hash value groups of the sorted bit array groups are computed, each of the hash value groups comprising a hash value of a bit array of a key in a sorted bit array group and a hash value of a bit array of a value corresponding to the key in the sorted bit array group. Table 7 shows hash value groups of the sorted bit array groups shown in Table 6.

TABLE 7

| Hash(sorted bit array of Key) | Hash(sorted bit array of Value) |
|---|---|
| e75e438d30053208b36575623ff53be5 | c3d5cb99bb77c24003bbb10fe0b43af5 |
| fe2ef0784fb1fb31a2b4a534da4793d3 | c68b6fe49558e324bdabc670d1f993dd |
| 694e8d1f2ee056f98ee488bdc4982d73 | eccbc87e4b5ce2fe28308fd9f2a7baf3 |

At step 740, the hash value groups are composed into a second group of characters according to the predefined policy. The predefined policy also defines how to compose any two hash values into the second group of characters. In some embodiments, there may be no delimiter between two hash values in the second group of characters. In some embodiments, there may be a predefined delimiter between two hash values in the second group of characters, such as ";", ",", "-", blank space, and the like. For example, first sorted hash value group, second sorted hash value group and third sorted hash value group shown in Table 7 are combined in sequence into a second group of characters shown in Table 8, in which no delimiter is used between two hash values. Those skilled in the art may understand that hash values can also be composed into the second group of characters in another manner, such as all hash values of sorted bit array of keys are placed at the beginning of the group of characters, while all hash values of sorted bit array of values are placed at the end of the group of characters, or in other manners.

TABLE 8 e75e438d30053208b36575623ff53be5c3d5cb99bb77c24003bbb10fe0b43af5
fe2ef0784fb1fb31a2b4a534da4793d3c68b6fe49558e324bdabc670d1f993dd
694e8d1f2ee056f98ee488bdc4982d73eccbc87e4b5ce2fe28308fd9f2a7baf3

At step 750, a hash value of the second group of characters is computed as the hash value of the structural data. For example, a hash value of the second group of characters in Table 8 using MD5 is 7c33c152910add 754582c5 808fa3cfbc, thus the hash value of the order 400 can be believed as 7c33c152910add754582c5808fa3cfbc. In fact, a bit array of the above group of characters in Table 8 is first obtained in the implementation, then the hash value of the bit array is computed.

In this way, although two orders 400, which are substantially the same but expressed in different data structures, and/or with different element sequences, and/or in different programming languages, and/or in different platforms, hash values of the two orders 400 can be obtained consistently.

It should be noted that the processing of hashing structural data according to embodiments of this disclosure could be implemented by computer system/server 12 of FIG. 1 or node 10 in FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Definitions for certain terms are provided below:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A computer-implemented method comprising:
receiving two sets of structural data, a first dataset expressed in a first programming language and a second dataset expressed in a second programming language, the two sets of structural data including a plurality of keys and a plurality of respectively corresponding values, the two sets of structural data having matching keys and matching respectively corresponding values;
parsing a first plurality of key-value pairs from the first dataset and a second plurality of key-value pairs from the second dataset;
obtaining a first set of bit array groups of the first plurality of key-value pairs, each bit array group representing a corresponding key-value pair of the first plurality of key-value pairs;
computing a first set of hash value groups of the first set of bit array groups;
obtaining a second set of bit array groups of the second plurality of key-value pairs, each bit array group representing a corresponding key-value pair of the second plurality of key-value pairs;
computing a second set of hash value groups of the second set of bit array groups;
sorting the first set of hash value groups and the second set of hash value groups into a first sorted group and a second sorted group according to a first predefined policy for arranging hash value groups;
determining the two sets of structural data have the same meaning by identifying a resulting hash value group matching the first sorted group and the second sorted group;
verifying the two sets of structural data are consistent based, at least in part, upon the identification of the resulting hash value group matching the first sorted group and the second sorted group; and
responsive to the verification that the two sets of structural data are consistent, sending, to a first entity, a validated structural data set, with the validated structural data set including information indicating that the data included in the first dataset and the second dataset are the same, with the first entity being a manufacturer that utilizes the validated structural data set;
wherein:
the first programming language is different than the second programming language.

2. The method of claim 1 further comprising:
composing the first sorted group into a first group of characters according to the first predefined policy; and
computing a first hash value of the first group of characters as a first overall hash value of the first dataset.

3. The method of claim 1 wherein, according to the first predefined policy, the first set of hash value groups and the second set of hash value groups are sorted based on at least one of the following:
a hash value of a bit array of a key in each hash value group;
a hash value of a bit array of a value respectively corresponding to a key in each hash value group; and/or a composition of a hash value of a bit array of a key and a hash value of a bit array of a value respectively corresponding to the key in each hash value group.

4. The method of claim 1 further comprising:
sorting the first and second sets of bit array groups according to the first predefined policy;
wherein:
computing the first and the second sets of hash value groups is performed on the sorted first and second sets of bit array groups.

5. The method of claim 4 wherein according to the first predefined policy, the first and the second sets of bit array groups are sorted based on at least one of the following:
a bit array of a key in each bit array group;
a bit array of a value respectively corresponding to a key in each bit array group; and/or
a composition of a bit array of a key and a bit array of a value respectively corresponding to the key in each bit array group.

6. A computer system comprising:
a processor(s) set;
a machine readable storage device; and
computer code stored on the machine readable storage device, with the computer code including instructions and data for causing the processor(s) set to perform operations including the following:
receiving two sets of structural data, a first dataset expressed in a first programming language and a second dataset expressed in a second programming language, the two sets of structural data including a plurality of keys and a plurality of respectively corresponding values, the two sets of structural data having matching keys and matching respectively corresponding values,
parsing a first plurality of key-value pairs from the first dataset and a second plurality of key-value pairs from the second dataset,
obtaining a first set of bit array groups of the first plurality of key-value pairs, each bit array group representing a corresponding key-value pair of the first plurality of key-value pairs,
computing a first set of hash value groups of the first set of bit array groups,
obtaining a second set of bit array groups of the second plurality of key-value pairs, each bit array group representing a corresponding key-value pair of the second plurality of key-value pairs,
computing a second set of hash value groups of the second set of bit array groups,
sorting the first set of hash value groups and the second set of hash value groups into a first sorted group and a second sorted group according to a first predefined policy for arranging hash value groups,
determining the two sets of structural data have the same meaning by identifying a resulting hash value group matching the first sorted group and the second sorted group,
verifying that two sets of structural data are consistent based, at least in part, upon the identification of the resulting hash value group matching the first sorted group and the second sorted group, and
responsive to the verification that the two sets of structural data are consistent, sending, to a first entity, a validated structural data set, with the validated structural data set including information indicating that the data included in the first dataset and the second dataset are the same, with the first entity being a manufacturer that utilizes the validated structural data set;
wherein:
the first programming language is different than the second programming language.

7. The computer system of claim 6 further comprising:
composing the first sorted group into a first group of characters according to the first predefined policy; and
computing a first hash value of the first group of characters as a first overall hash value of the first dataset.

8. The computer system of claim 6 wherein according to the predefined policy, the first set of hash value groups and the second set of hash value groups are sorted based on at least one of the following:
a hash value of a bit array of a key in each hash value group;
a hash value of a bit array of a value respectively corresponding to a key in each hash value group; and/or
a composition of a hash value of a bit array of a key and a hash value of a bit array of a value respectively corresponding to the key in each hash value group.

9. The computer system of claim 6 further comprising:
sorting the first and second sets of bit array groups according to the first predefined policy;
wherein:
computing the first and the second sets of hash value groups is performed on the sorted first and second sets of bit array groups.

10. The computer system of claim 9 wherein according to the predefined policy, the first and the second sets of bit array groups are sorted based on one of the following:
a bit array of a key in each bit array group;
a bit array of a value respectively corresponding to a key in each bit array group; and/or
a composition of a bit array of a key and a bit array of a value respectively corresponding to the key in each bit array group.

11. A computer program product comprising:
a non-transitory computer readable storage medium; and
computer code stored on the non-transitory computer readable storage medium, with the computer code including instructions and data for causing a processor(s) set to perform operations including the following:
receiving two sets of structural data, a first dataset expressed in a first programming language and a second dataset expressed in a second programming language, the two sets of structural data including a plurality of keys and a plurality of respectively corresponding values, the two sets of structural data having matching keys and matching respectively corresponding values,
parsing a first plurality of key-value pairs from the first dataset and a second plurality of key-value pairs from the second dataset,
obtaining a first set of bit array groups of the first plurality of key-value pairs, each bit array group representing a corresponding key-value pair of the first plurality of key-value pairs,
computing a first set of hash value groups of the first set of bit array groups,
obtaining a second set of bit array groups of the second plurality of key-value pairs, each bit array group representing a corresponding key-value pair of the second plurality of key-value pairs, computing a second set of hash value groups of the second set of bit array groups, sorting the first set of hash value groups and the second set of hash value groups into a first sorted group and a second sorted group according to a first predefined policy for arranging hash value groups, determining the two sets of structural data have the same meaning by identifying a resulting hash value group matching the first sorted group and the second sorted group, verifying that two sets of structural data are consistent based, at least in part, upon the identification of the resulting hash value group matching the first sorted group and the second sorted group, and responsive to the verification that the two sets of structural data are consistent, sending, to a first entity, a validated structural data set, with the validated structural data set including information indicating that the data included in the first dataset and the second dataset are the same, with the first entity being a manufacturer that utilizes the validated structural data set;

wherein:

the first programming language is different than the second programming language.

12. The computer program product of claim 11 further comprising:

composing the first sorted group into a first group of characters according to the first predefined policy; and computing a first hash value of the first group of characters as a first overall hash value of the first dataset.

13. The computer program product of claim 11 wherein according to the predefined policy, the first set of hash value groups and the second set of hash value groups are sorted based on at least one of the following:

a hash value of a bit array of a key in each hash value group;

a hash value of a bit array of a value respectively corresponding to a key in each hash value group; and/or a composition of a hash value of a bit array of a key and a hash value of a bit array of a value respectively corresponding to the key in each hash value group.

14. The computer program product of claim 11 further comprising:

sorting the first and second sets of bit array groups according to the first predefined policy;

wherein:

computing the first and the second sets of hash value groups is performed on the sorted first and second sets of bit array groups.

15. The computer program product of claim 14 wherein according to the predefined policy, the first and the second sets of bit array groups are sorted based on at least one of the following:

a bit array of a key in each bit array group;

a bit array of a value corresponding to a key in each bit array group; and/or a composition of a bit array of a key and a bit array of a value corresponding to the key in each bit array group.

16. The computer-implemented method of claim 1 wherein:

the first and second plurality of key-value pairs includes keys and respectively corresponding values;

the first set of bit array groups includes bit arrays of the keys and bit arrays of the respectively corresponding values of the first plurality of key-value pairs;

the first set of hash value groups consist of two hash values, a first hash value of bit arrays of the keys and a second hash value of bit arrays of respectively corresponding values;

the second set of bit array groups includes bit arrays of the keys and bit arrays of the respectively corresponding values of the second plurality of key-value pairs; and the second set of hash value groups consist of two hash values, a third hash value of bit arrays of the keys and a fourth hash value of bit arrays of respectively corresponding values.

17. The computer system of claim 6 wherein:

the first and second plurality of key-value pairs includes keys and respectively corresponding values;

the first set of bit array groups includes bit arrays of the keys and bit arrays of the respectively corresponding values of the first plurality of key-value pairs;

the first set of hash value groups consist of two hash values, a first hash value of bit arrays of the keys and a second hash value of bit arrays of respectively corresponding values;

the second set of bit array groups includes bit arrays of the keys and bit arrays of the respectively corresponding values of the second plurality of key-value pairs; and the second set of hash value groups consist of two hash values, a third hash value of bit arrays of the keys and a fourth hash value of bit arrays of respectively corresponding values.

18. The computer program product of claim 11 wherein:

the first and second plurality of key-value pairs includes keys and respectively corresponding values;

the first set of bit array groups includes bit arrays of the keys and bit arrays of the respectively corresponding values of the first plurality of key-value pairs;

the first set of hash value groups consist of two hash values, a first hash value of bit arrays of the keys and a second hash value of bit arrays of respectively corresponding values;

the second set of bit array groups includes bit arrays of the keys and bit arrays of the respectively corresponding values of the second plurality of key-value pairs; and the second set of hash value groups consist of two hash values, a third hash value of bit arrays of the keys and a fourth hash value of bit arrays of respectively corresponding values.

19. The computer-implemented method of claim 2 further comprising:

composing the second sorted group into a second group of characters according to the first predefined policy;

computing a second hash value of the second group of characters as a second overall hash value of the second dataset; and identifying a resulting overall hash value matching the first overall hash value and the second overall hash value.

20. The computer system of claim 7 further comprising:

composing the second sorted group into a second group of characters according to the first predefined policy;

computing a second hash value of the second group of characters as a second overall hash value of the second dataset; and identifying a resulting overall hash value matching the first overall hash value and the second overall hash value.

* * * * *